United States Patent [19]

Reinaud

[11] Patent Number: 4,703,820
[45] Date of Patent: Nov. 3, 1987

[54] VEHICLE GUIDANCE MEANS
[75] Inventor: Guy F. Reinaud, Dampiere en Yvelines, France
[73] Assignee: Imperial Chemical Industries, PLC, London, England
[21] Appl. No.: 738,645
[22] Filed: May 28, 1985
[30] Foreign Application Priority Data
May 31, 1984 [GB] United Kingdom ................ 8413913
[51] Int. Cl.[4] ............................................. B60T 7/16
[52] U.S. Cl. ...................................... 180/169; 172/2; 250/202; 340/686; 356/4
[58] Field of Search ................ 180/169, 167; 172/4.5, 172/2; 250/202; 340/52 R, 52 H, 686; 343/18 C; 356/4, 399, 400, 152, 375

[56] References Cited
U.S. PATENT DOCUMENTS

| | | | |
|---|---|---|---|
| 3,046,681 | 7/1962 | Kutzler | 172/4.5 |
| 3,194,966 | 7/1965 | Hulett | 250/203 |
| 3,200,400 | 8/1965 | Gill, Jr. | 343/18 C |
| 3,426,146 | 2/1969 | Seaman | 172/4.5 |
| 3,617,629 | 11/1971 | McCarthy et al. | 250/202 |
| 3,659,949 | 5/1972 | Walsh et al. | 172/4.5 |
| 4,166,506 | 9/1979 | Tezuka et al. | 172/4.5 |
| 4,401,880 | 8/1983 | Pond et al. | 250/203 R |
| 4,550,250 | 10/1985 | Mueller et al. | 356/375 |

FOREIGN PATENT DOCUMENTS

| | | |
|---|---|---|
| 0068626 | 5/1982 | European Pat. Off. . |
| 2423689 | 5/1974 | Fed. Rep. of Germany . |
| 2495797 | 12/1980 | France . |
| 57-108707 | 10/1982 | Japan . |
| 96267 | 6/1983 | Japan ...................................... 356/4 |
| WO81/01195 | 10/1979 | PCT Int'l Appl. . |

Primary Examiner—John J. Love
Assistant Examiner—Eric D. Culbreth
Attorney, Agent, or Firm—Cushman, Darby & Cushman

[57] ABSTRACT

A vehicle guidance system for a tractor has a horizontal scanning laser on the tractor and a target arranged to return the laser beam along its path. When returned laser light is detected, indicating alignment of the beam with the target, the angle of the beam relative to the tractor axis illustrates the steering correction required. The target has an array of beam reflecting elements patterned to define a target datum. Continuous low amplitude and relative high frequency scanning of the laser in a vertical direction provides a detector output which is indicative of the error between beam orientation and target datum.

9 Claims, 6 Drawing Figures

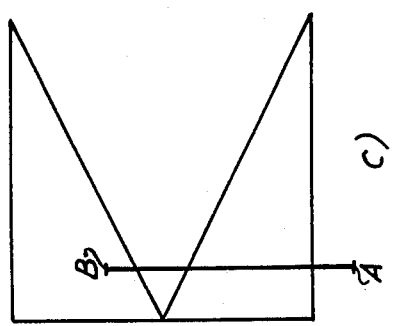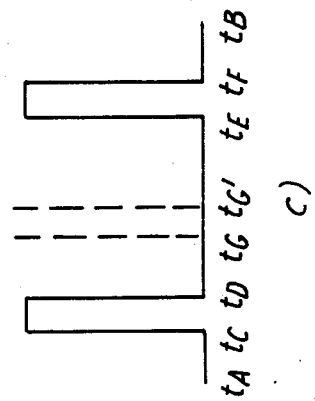
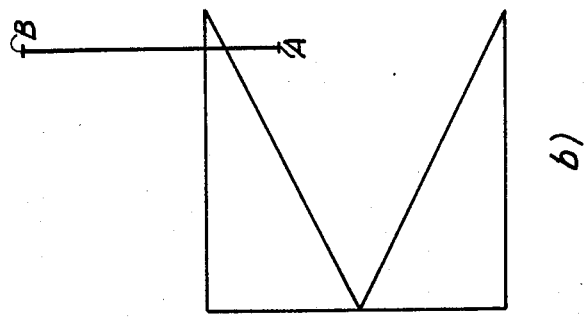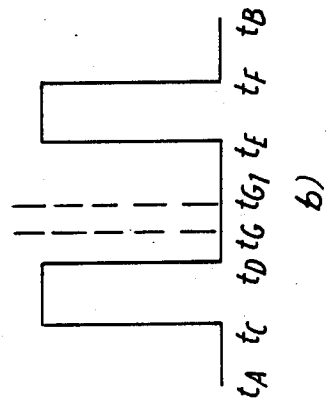
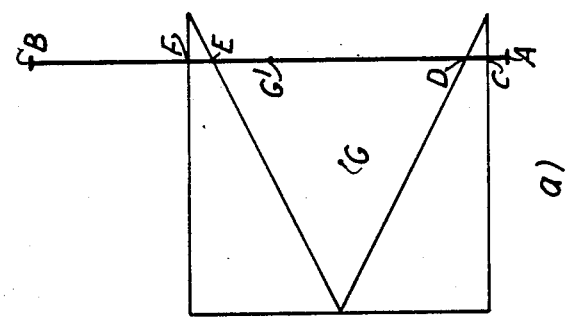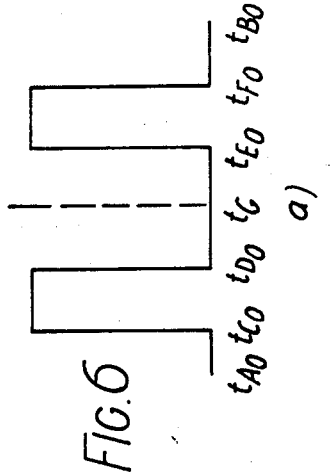
FIG.4  FIG.6

VEHICLE GUIDANCE MEANS

BACKGROUND OF THE INVENTION

This invention relates to vehicle guidance means for use, in the most important example, with tractors and other agricultural vehicles.

A vehicle guidance system has been proposed in published European application No. 68626 which employs a laser on the vehicle to direct a laser beam along the direction of motion of the vehicle towards a target which carries beam reversing means and is positioned on the vehicle path so as to direct the beam back to the vehicle. The returned beam can, it is suggested, be detected visually by the vehicle driver or electronically with photo-electric cells or the like driving a display which is energized when the vehicle is on course, that is to say heading towards the target. The quoted specification further suggests the use of two electronic detectors positioned one each side of the beam path to enable an indication to be given on whether the vehicle is departing from its course to the left or to the right, thus giving the sense of the required steering correction. The two detectors can be used to drive a display indicating LEFT, ON COURSE or RIGHT. Alternatively, the input of the detectors can—in the case of a driverless vehicle—be coupled to means controlling the direction of motion of the vehicle.

SUMMARY OF THE INVENTION

It is an object of this invention to provide improved vehicle guidance means which offers more accurate control and which, in particular, provides a measure of the amount by which the vehicle heading departs from the desired path. Such a measure enables a steering correction to be applied which is correct both in sense and magnitude so as to bring the vehicle to the correct heading rapidly and without overshoot. This is particularly important in the case of driverless vehicles but is also of advantage in giving more comprehensive information to a vehicle driver.

Accordingly, the present invention comprises a vehicle guidance means comprising a laser for mounting on the vehicle; horizontal scanning means for scanning the laser beam horizontally; indicating means providing an output indicative of the orientation of the laser beam in a horizontal plane relative to the vehicle heading; a positionable fixed target comprising a two-dimensional array of beam reversing means for returning an incident laser beam along the same path, the vertical depth of array varying in the horizontal direction across the target; vertically scanning means for scanning the laser beam vertically over the target such that laser light is returned by the beam reversing means over an interval determined by the vertical depth of the array varying in the horizontal direction across the target; vertical scanning means for scanning the laser beam vertically over the target such that last light is returned by the beam reversing an interval determined by the vertical array of the depth of the array and is thereby indicative of the horizontal position of the beam relative to the target;

Advantageously said higher frequency scanning is in the vertical direction.

In one form of the invention, said target is adapted to return an incident laser beam over a small range of scanning, the detection means further comprising means for measuring that portion of the total scanning movement for which a reflected beam is returned by the target, this measurement being indicative of the distance of the vehicle from the target.

Suitably, the scanning means is capable in a search mode of scanning through a relatively large horizontal arc until the target is located, the scanning means being thereafter controlled in feedback through the detection means to maintain the laser beam in alignment with the target.

BRIEF DESCRIPTION OF THE DRAWINGS

The invention will now be described by way of example with reference to the accompanying drawings in which:

FIGS. 4a, b and c are diagrams illustrating certain parameters in relation to the target at respective operative positions.

FIGS. 6a, b and c depict a sequence of graphs showing detector waveforms for various orientations of the laser beam relative to the target.

DETAILED DESCRIPTION OF A PREFERRED EMBODIMENT

Figure 1:
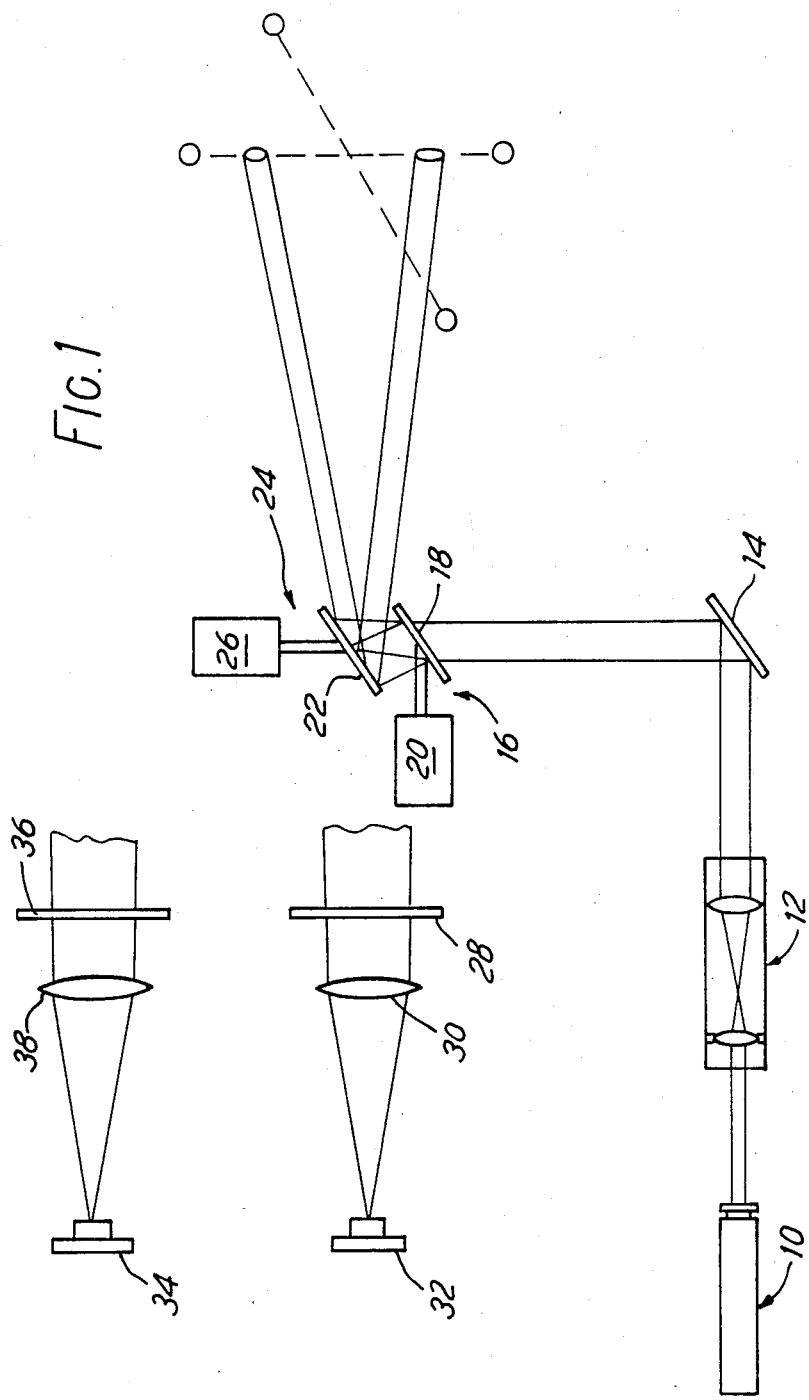
FIG. 1 is a diagram illustrating optical elements of guidance means according to this invention

In the example illustrated in the drawings, the guidance means according to the inventions serve to guide a tractor in a series of straight line paths over a field to be cultivated or treated. The guidance means generally comprise a tractor mounted laser and one or more targets, positioned usually at the field edges. Occasionally, a supplemental target or targets will be positioned in the middle of the field if the ground contours are such that there is no direct line of sight across the field. The tractor mounted laser will be described first, together with the associated scanning and detection devices.

Referring to FIG. 1, the vehicle guidance means comprises a helium-neon laser 10 operating at 6328 A° and directing a laser beam through beam expander 12 to a fixed mirror 14. The laser 10 produces a beam of diameter 1 mm and divergence $10^{-1}$ radians. Beam expander 12 increases the beam diameter to 10 mm and reduces the divergence to $10^{-4}$ radians. From fixed mirror 14 the beam is directed to horizontal scanning means 16 comprising an inclined mirror 18 mounted on a shaft for rotation by a scanning motor 20. The beam is reflected from this mirror 18 to the mirror 22 of a vertical scanning means 24 similarly including a mirror shaft rotatable in a scanning motor 26. The vertical scanning means 24 is disposed above the horizontal scanning means and is orthogonal thereto. Through control of the vertical and horizontal scanning motors in a manner which will be described, the laser beam can be moved through the desired scanning pattern. The position of the laser beam at any time can be defined by two angles, $\theta_x$ being the angle in a horizontal plane between the beam and the tractor axis or heading and $\theta_y$ being the corresponding angle in a vertical plane. The mirrors are of high optical quality and in the preferred embodiment take the form of multi-layer dielectrics.

Figure 3:
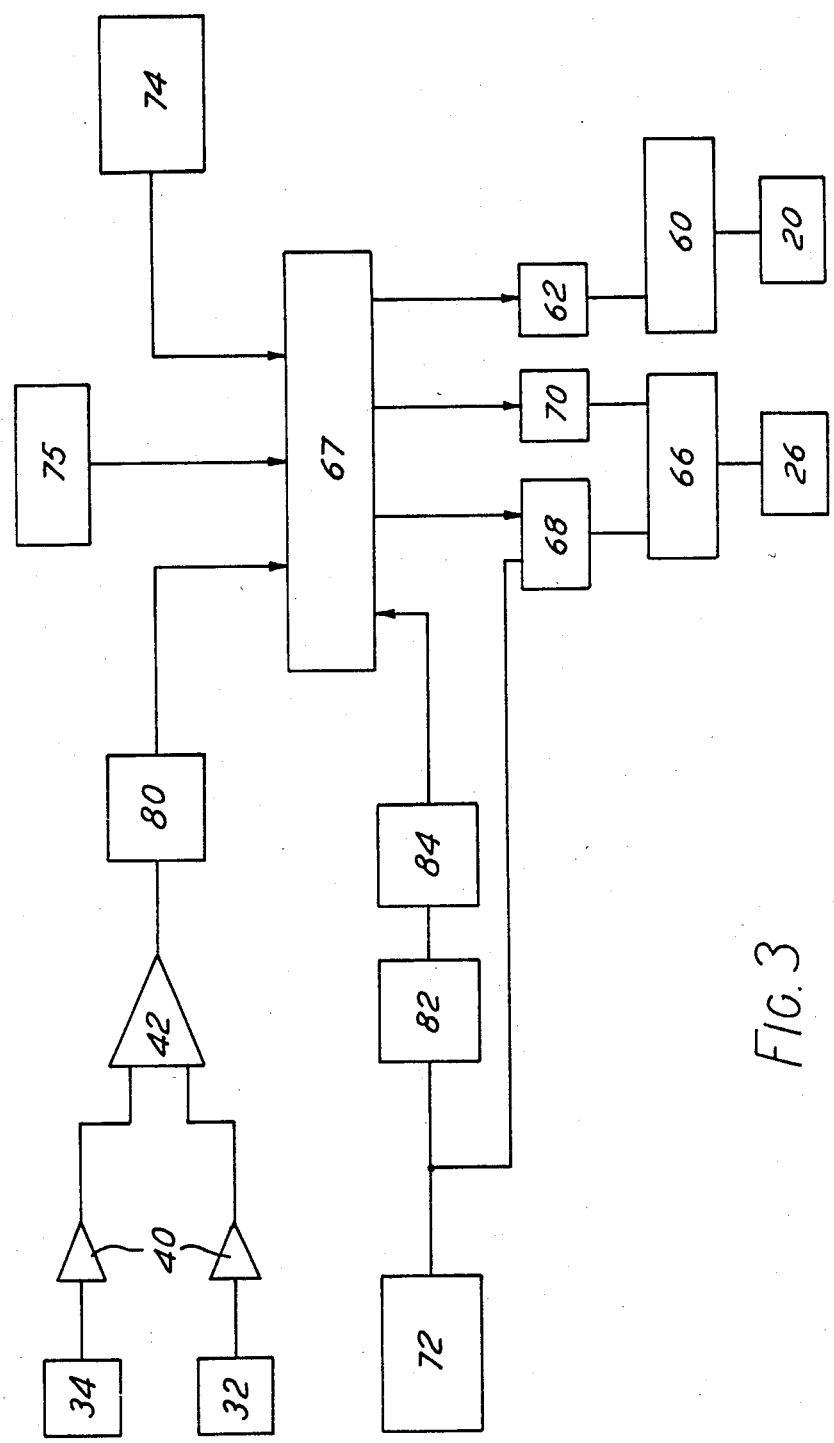
FIG. 3 is a block diagram showing parts of the guidance means of FIG. 1.

Light reflected from the target described below passes through interference filter 28 with a pass band centred on 6328 A° and is focused by Fresnel lens 30 onto a photoelectric detector 32. Although not evident from the drawing, lens 30 is positioned at a higher level than the horizontal scanning motor 30 which is therefore no obstacle to the returning light. Alongside the detector 32 there is positioned a further reference detector 34 receiving light through a second interference filter 36 and Fresnel lens 38. The pass band of the second interference filter is centred on 6200 A°. The two detectors are matched and are arranged to have equal fields of vision. As shown in FIG. 3, the outputs of the two detectors are passed through identical pre-amplifiers 40 to opposite inputs of a differential amplifier 42 which therefore produces an output which is substantially insensitive to changes in ambient light. By way of explanation, detector 32 will produce an output determined by the natural light flux at 6328 A° plus reflected laser light. The output of detector 34 will be determined solely by the natural light flux at 6200 A°. On the assumption that the natural light flux at 6328 A° is very close to that at 6200 A°, the differential amplifier will have the effect of subtracting out the effect of natural light.

The optical elements shown in FIG. 1 are mounted upon a rigid base plate (not shown). The base plate is in turn mounted upon the tractor and this tractor mounting preferably incorporates vibration damping of a suitable known form.

Figure 2:
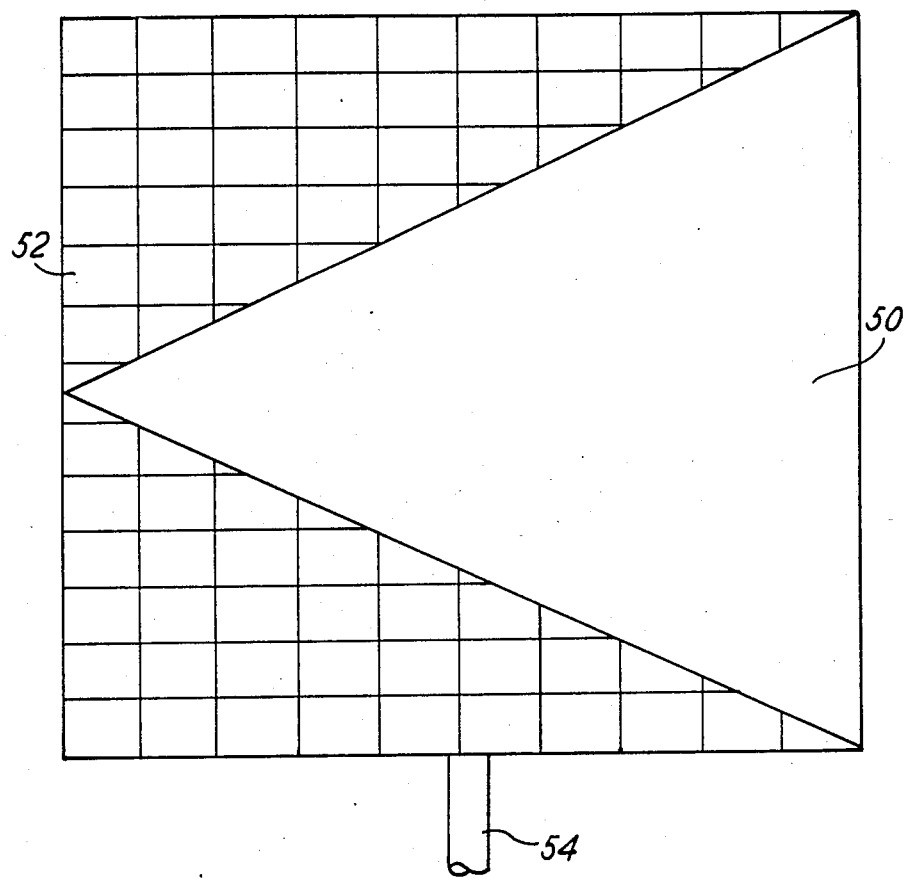
FIG. 2 is a diagrammatic view of a target forming part of the guidance means.

Referring now to FIG. 2, the target comprises a rectangular board 50 upon which is mounted beam reversing means 52 in the form of an array of so called "corner cubes". A corner cube may notionally be obtained by standing a hollow cube on one corner and cutting it horizontally through three corners. If the inner surface of such a corner cube are reflective, they have the property of reversing an incident light ray upon the same path. The corner cubes are arranged in a generally square array of dimension 80 cms with corner cubes being absent in a central triangular section having its base as one vertical side of the board and its apex as the midpoint of the opposing vertical side.

The target board 50 is mounted on a post 54 which may be located in one of a number of ground sockets positioned around the perimeter of the field. The height of the post is such that the target board is at generally the same height as the tractor mounted laser. A suitable arrangement for the location of targets is described in the co-pending application to which reference is made above. Alternatively, the target may be mounted on a crawler or other automatically movable device enabling the same target to be moved from position to position around the field as required.

The means by which the laser beam is scanned vertically and horizontally can now be described. Reference is directed particularly to FIGS. 3 and 4. The horizontal scanning motor 20 is controlled through a horizontal scanning control 60. The scanning control operates on the motor so as to bring the mirror, and therefore the beam, to any one of 4096 horizontally offset angular positions determined by the voltage level input to the scanner control 60. This input voltage is derived from a horizontal digital to analog converter 62 which in turn receives a 12 bit input from a processor unit 67. This processor may be a commercially available microprocessor.

The vertical scanning motor 26 is controlled through a vertical scanner control 66 so as to provide a continuous vertical scan of preselected amplitude about a determined vertical offset position. Referring to FIG. 4(a), the beam is caused to scan continuously along vertical line AB about a central point G' which may take any one of 4096 positions offset vertically. The vertical scanner control 66 receives scan amplitude and offset input voltage levels from, respectively, a vertical amplitude digital D/A converter 68 and a vertical offset D/A converter 70. The offset D/A converter 70 receives a 12 bit signal from the processor 67 so providing the range of 4096 positions of vertical offset. An 8 bit signal is provided by the processor 67 to the amplitude D/A converter 68 which also receives a saw tooth wave form from sawtooth generator 72. The output of the D/A converter 68 is a saw tooth waveform whose amplitude takes one of 256 position levels determined by the value of the 8 bit digital signal from the processor.

It will be appreciated that the value of the 12 bit horizontal offset signal when the laser beam is centered upon the target will represent the bearing of the target relative to the tractor. This value is supplied by the processor to output device 74 which may be a steering control device adapted to maintain the tractor on the correct course or a visual display for the assistance of the tractor operator. A convenient display might take the form of a needle or bar type display indicating how far to the left or right the tractor heading is from the required direction. An input device 75 comprises a keypad for entering commands.

The manner in which the device senses when the laser beam is centred on the target will now be described.

Figure 5:
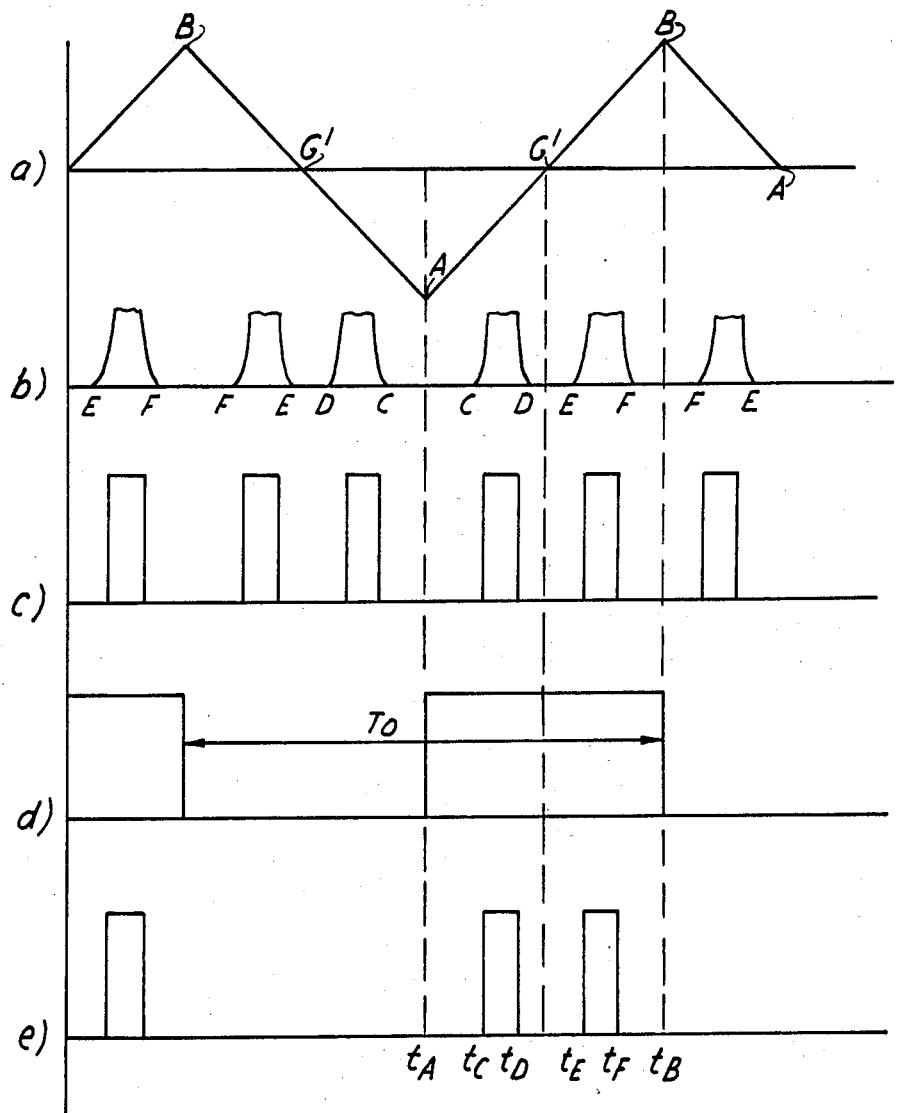
FIGS. 5a, b, c, d and e depict a sequence of graphs showing the electrical output of certain elements in FIG. 3.

Referring now to FIG. 5, diagram 5(a) shows the sawtooth waveform which is essentially the voltage supplied to the vertical scanning motor. This diagram can therefore be regarded as showing the continuous variation with time of the vertical position of the laser beam. It will be convenient to take an example where the laser beam is not exactly centered upon the target but is in sufficient alignment for reflection to occur. Referring to FIG. 4(a), the amplitude of the scanning movement is shown by line AB having a center point G' which is offset both horizontally and vertically from the true center G of the target. In the upward sweep of the laser beam from A to B it will be seen that reflection will occur in travelling between points C and D and between points E and F as shown in the Figure; points C, D, E and F representing the intersection of the vertical scanning line AB with the boundary of the reflecting portion of the target. The output of differential amplifier 42 (which is the detector signal after subtraction of natural light) is shown in diagram 5(b). This signal is passed through a pulse shaper 80 to the processor 67, the shape of processor input being shown as diagram 5c.

In order to provide the processor with an input signal which is synchronous with the vertical scanning movement, the wave form from the sawtooth generator 72 is used to trigger a bistable device 82 providing a square wave output. As a result primarily of the mechanical linkage, there will be a phase delay between the sawtooth wave and the actual scanning movement of the laser beam over the target. For this reason, the square wave signal is passed through a delay device 84 before being presented as a further input to the processor. This further input signal is shown as diagram 5d.

To simplify the processing, only the reflection from the target in the upward sweep of the vertical is considered scanning. This is achieved by effectively ANDing the signals of 5(c) and 5(d) internally of the processor to produce the signals shown at 5(e).

If the laser beam is correctly centered on the target, in both horizontal and vertical directions (that is to say the points G and G' in FIG. 4(a) are coincident) the processor signal will be as shown in FIG. 6(a). Times $t_A$ to $t_F$ are measured by the processor from a suitable datum time. In the correctly centered position, it is evident that:

$$t_{G'} = \frac{t_B + t_A}{2} = \frac{t_{Fo} + t_{Co}}{2} = t_G$$

where the subscript o refers here and throughout to the correctly centered position of the scanning beam relative to the target.

In the case where the beam is sufficiently aligned with the target to provide a detectable reflection, but is not centered in the vertical direction, a signal is produced such as that shown in FIG. 6(b). The angular offset $\Delta\theta_y$ in the vertical direction, being the change in $\theta_y$ necessary for centering on the target, is given by:

$$\Delta\theta_y = t_{G'} - t_G$$

Because of the formation of the target as two like right angled triangles, one can see from FIG. 4 that when the beam is correctly centered in the horizontal direction:

$$(t_{Do} - t_{Co}) + (t_{Fo} - t_{Eo}) = (t_{Eo} - t_{Do})$$

In a position such as that shown in FIG. 6(c), in which the beam is not centred but is sufficiently close to provide a reflected signal, one can define a value $\Delta t$:

$$\Delta t = (t_E - t_D) - ((t_F - t_E) + (t_D - t_C))$$

where $\Delta t$ is proportional to the horizontal angular offset $\Delta\theta_x$ between the direction of the laser beam and a line from the tractor to the center of the target. If $\Delta t$ is negative, the point G' as shown in FIG. 4 is known to be to the right of the target center G. If $\Delta t$ is positive, G' is known to be to the left of point G.

It can thus be seen that the processor is able to calculate both the horizontal $\Delta\theta_x$ and vertical $\Delta\theta_y$ angular offsets of the beam relative to the target center. These are used in a feedback manner to bring and to maintain the beam in accurate alignment with the target. Then it will be seen that the value of $\theta_x$ or the orientation of the horizontal scanning means, represents the angle between the heading of the motor and a line from the tractor to the target. This line being the course to which the vehicle should be brought.

It is desirable for the processor, in addition, to calculate the distance between the tractor and the target, this being used, for example, to determine when the tractor should turn at the end of each traverse. It will be seen that $t_B - t_A = T_o/2$, that is to say one half period of the vertical scan. This value is of course independent of the amplitude Ay of the scanning. The time $t_F - t_C$ represents the time for which the scanning beam is on the target. If the amplitude of the scanning is large, the time $t_F - t_C$ will be small compared with $T^o/2$. That is to say the scanning beam will spend most of its time off the target. If the amplitude of the scanning is small, the time $t_F - t_C$ will approach $T_o/2$.

If H is the height of the target and D is the distance from the tractor to the target, it will be seen that the time $t_F - t_C$ is proportional to H/D. If is of course necessary to ensure that the amplitude of the vertical scanning is always sufficient to cover the entire target and it is therefore advantageous, rather than to calculate $t_F - t_C$, to ensure through continuous control of the amplitude Ay that $T_o/2 = k(t_F - t_C)$. The value of the constant k may conveniently be taken as three so that in each vertical sweep, the beam spends one-third of its time upon the target. The distance of the tractor from the target is then given by $D = kH/A_y$ where k and H are both known and Ay is measured in radians.

The manner of operation of the described guidance means can now be understood.

Before guidance can commence, the target must first be located and this is achieved by a stepwise movement of the scanning beam through the possible range of horizontal and vertical offsets with a fixed amplitude of continuous vertical scanning. Conveniently, the processor would generate initialized horizontal and vertical offset signals of 2048 (that is to say mid range) and an amplitude signal of 32 (recognizing that the target is probably distant), these signals being passed to the respective D/A convertors. The scanning in this search mode may take a variety of forms; in one example the vertical offset remains constant for one horizontal sweep and is then increased by one for a second horizontal sweep above the initial sweep, then decreased by two for a third sweep below the first sweep, then increased by three for a fouth sweep above the second sweep, and so on. In this way the entire field of view is covered in a series of horizontal sweeps increasingly distant from the initial vertical position. The search mode continues until such time as a reflected signal is detected by the processor. A preliminary value of $\theta_x$ is then available, being the current 12 bit signal applied to the horizontal scanning means. The apparatus then passes into a guidance mode in which the error $\Delta\theta_x$ is calculated and brought through feedback to zero.

It may be that the signal as first detected does not take the form shown in diagram 5(e). Thus if the vertical scan AB intersects only part of the target as shown in FIG. 4b, or 4c for example, signals will be detected which have less than the four positive and negative going edges per scan as shown in FIG. 5e. Routines are provided in the processor to modify the vertical scanning until a signal is produced having four edges.

Calculations are then performed as described above to produce $\Delta\theta_y$ and $\Delta\theta_x$ and, through selection and then measurement of Ay, D. The current value of $\theta_y$, being the 12 bit signal applied to the vertical scanning means, is updated in the processor to $\theta_y + \Delta\theta_y$ and $\theta_x$ is similarly updated to $\theta_x + \Delta\theta_x$. The distance D is available as a system output but is also used to ensure that the gain of the preamplifiers 40 is optimum. Appropriate gain levels for particular ranges of distance are predefined, and the appropriate gain is selected in accordance with the calculated value of D. This invention has been described by way of example only and a variety of modifications are possible without departing from the scope of the invention. The described scanning means are but one example of a variety of devices which perform the required function. Different detectors can be used and, in particular, other arrangements employed to compensate for background light. This compensation might be achieved without the need for two matched detectors; the laser could for example be chopped and a reading of background light taken during the laser off period and stored.

The described arrangement in which the laser beam is continuously scanned about a small vertical range, the center of which can be offset both horizontally and vertically, is felt to be particularly advantageous. It enables both horizontal and vertical error signals to be produced enabling accurate control with the use of a target that is still large enough to enable rapid location in a search mode. Other target patterns could be employed giving the necessary variation in amplitude of the detected signal. A further advantage of the continuous scanning (which may be horizontal rather than vertical) lies in the ability to measure distance. This is a very useful measurement in guiding the tractor near the field edges but is also of value in enabling the signal gain to be varied with the distance. Whilst the continuous scanning is preferable for the above reasons, it would be possible in certain cases to define a datum point on the target with only stepwise movement of the laser beam.

This invention is felt to have particular application in the guidance of tractors and other agricultural vehicles. In this application, accuracy of guidance has important benefits in, for example, avoiding damage to crops and minimizing wastage of expensive chemicals. It is also important that the major part of the guidance means lies on the tractor since one tractor will be required to operate in many fields. Nevertheless, this invention may be useful in the guidance of other vehicles such as, for example, snow clearing appliances on airfields and the like.

I claim:
1. A vehicle guidance means comprising:
a laser for mounting on the vehicle;
horizontal scanning means for scanning the laser beam horizontally;
indicating means providing an output indicative of the orientation of the laser beam in a horizontal plane relative to the vehicle heading; a positionable fixed target comprising a two-dimensional array of beam reversing means for returning an incident laser beam along the same path, the vertical depth of the array varying in the horizontal direction across the target;
vertical scanning means for scanning the laser beam vertically over the target such that laser light is returned by the beams reversing means over an interval determined by the vertical depth of the array and is thereby indicative of the horizontal position of the beam relative to the target;
detector means on the vehicle for detecting laser light returned from the target and for providing detector output representative thereof; and processor means for analyzing the detector output to determine the horizontal position of the laser beam relative to the target;
whereby the output of the indicator means when the laser beam is determined to be at a known position relative to the target provides an indication of the vehicle heading in relative to the target.

2. Vehicle guidance means according to claim 1, wherein the positional fixed target comprises two arrays of beam reversing means, the vertical depth of each array varying in like manner in the horizontal direction across the target and wherein the processor means is adapted to determine the horizontal position of the laser beam relative to the target from the interval over which the laser light is returned by each array of beam reversing means and the vertical position of the laser beam relative to the target from the location within the vertical scan at which laser light is returned by each array of beam reversing means.

3. Vehicle guidance means according to claim 1 wherein the vertical scanning means is adapted so to vary the amplitude of vertical scanning that the traverse of the laser beam in the plane of the target is in fixed ratio to the extent of the target parallel to the traverse.

4. Vehicle guidance means according to claim 1, wherein the processor means is further adapted to provide a measure of the distance from the vehicle to the target from the controlled amplitude of vertical scan.

5. The vehicle guidance means according to claim 1 said detection means further comprising means for measuring that portion of the total vertical scanning movement for which a reflected a returned by the target, this measurement being indicative of the distance of the vehicle from the target.

6. Vehicle guidance means according to claim 1, wherein the horizontal scanning means is capable in a search mode of scanning through a relatively large horizontal arc until the target is located, the scanning means being thereafter controlled in feedback through the detection means to maintain the laser beam in alignment with the target.

7. Vehicle guidance means according to claim 6 wherein automatic steering means are provided and serve to maintain the heading of the vehicle in horizontal alignment with the laser beam.

8. Vehicle guidance means according to claim 1, further comprising means for displaying said indication of the vehicle heading relative to the target to enable an appropriate steering correction to be applied manually.

9. Vehicle guidance means according to claim 1, further comprising automatic steering means controlled in response to said indication of vehicle heading relative to the target, to maintain alignment of the vehicle heading with the target.

* * * * *